United States Patent
Ueda et al.

[11] Patent Number: 6,111,714
[45] Date of Patent: Aug. 29, 2000

[54] DISK DRIVE AND WRITE CONTROL METHOD FOR A DISK DRIVE

[75] Inventors: Tetsuo Ueda, Sagamihari; Kiyoshi Satoh; Hiroyuki Ono, both of Fujisawa; Toshiaki Wada, Sagamihara, all of Japan

[73] Assignee: International Business Machines Corporation, Armonk, N.Y.

[21] Appl. No.: 09/049,785

[22] Filed: Mar. 27, 1998

[30] Foreign Application Priority Data

Mar. 27, 1997 [JP] Japan ................................ 9-075515

[51] Int. Cl.$^7$ ........................... G11B 15/04; G11B 5/596
[52] U.S. Cl. ................................. 360/60; 360/78.04
[58] Field of Search ........................ 360/60, 77.08, 360/78.06, 78.04

[56] References Cited

U.S. PATENT DOCUMENTS 5,570,244 10/1996 Wiselogel ........................ 360/60

FOREIGN PATENT DOCUMENTS

8-321149 12/1996 Japan ........................ G11B 21/10

*Primary Examiner*—W. Chris Kim
*Attorney, Agent, or Firm*—Monica D. Lee; Abdy Raissinia

[57] ABSTRACT

A disk drive and a control method for the disk drive to reduce the number of unnecessary write inhibition operations. A microprocessor unit (MPU) 6 sets an allowable value Cv for the velocity of a magnetic head 1 to V0 until the head passes over N1 sectors after completion of a seek operation, Cv to V1 until the head passes over N2 sectors after passage of N1 sectors, and Cv to V2 after passage of N2 sectors. (N1<N2 and V0<V1<V2) A hard-disk controller (HDC) 10 detects the velocity of the magnetic head 1, based on a position error signal PES from a servo sector regeneration section 8a, and prohibits the write operation of the magnetic head 1 if the velocity exceeds Cv.

10 Claims, 6 Drawing Sheets

DISK DRIVE AND WRITE CONTROL METHOD FOR A DISK DRIVE

BACKGROUND OF THE INVENTION

1. Field of the Invention

The present invention relates to a disk drive and a write control method for the disk drive. More particularly, the present invention relates to a disk drive and a write control method for the disk drive which reduces the number of unnecessary write inhibition operations.

2. Description of Related Art

Conventional hard-disk drives include one or more magnetic disks with concentrically formed circular tracks. The reading of information from the magnetic disk or the writing of information to the magnetic disk is performed after a seek operation. A seek operation moves a magnetic head in the radial direction of the magnetic disk to position the head over the desired track on the disk. During a seek operation, the head position identification information previously recorded of a predetermined area on the magnetic disk is read by the magnetic head in order to position the magnetic head over the desired track, while confirming the current position of the magnetic head. More specifically, during a seek operation, the positioning of the magnetic head is performed while the head position on a disk is confirmed based on the regenerative output of the servo sector recorded on a servo area.

When positioning the magnetic head over a desired track on the disk, the current position of the magnetic head is detected based on the regenerative output of the identification information which is regenerated by the magnetic head each time it is positioned over an identification information storage area. Then, if it is determined that the magnetic head has arrived at the desired track, a position (error) detection signal, which has a level that varies linearly in correspondence with the position of the magnetic head, is produced based on the regenerated signal from a burst pattern storage area. Furthermore, based on the position detection signal, the magnetic head is controlled so that it is positioned over the center (i.e., in the width direction) of the desired data track.

If a write operation is performed at an off-track position considerably removed from the center position of the desired track, the data stored on an adjacent track may be destroyed. For this reason, it is desirable to have a method for detecting whether or not the magnetic head is in the off-track state in order to inhibit a write operation when such a state exits.

For a sector servo type of hard-disk drive, a first criteria for determining an error in the head position is provided such that if the error in the head position exceeds this first criteria, then a write operation is inhibited. Furthermore, in a hard-disk drive such as this, a second criteria for the velocity in the track width direction of the magnetic head is also provided. If the velocity in the track width direction of the head exceeds the second criteria, a write operation is inhibited.

Immediately after the settling of the head during a seek operation, the vibration of the head actuator arm resulting from the seek operation is not attenuated thereby causing the position in the track width direction of the head to be unstable. For this reason, the criteria for the head velocity in the track width direction is set to take the most unstable state immediately after the settling of the head. This effectively prevents a write operation in the off-track state immediately after the settling.

For the invention disclosed in Published Unexamined Patent Application No. 8-321149 (Patent Application No. 7-124698), a read characteristic is changed for a fixed amount of time after the end of a seek operation. More specifically, the readable range in the track width direction is narrowed. Consequently, the write inhibition conditions after the end of a seek operation are made rigorous.

When writing the aforementioned tracking patterns on the magnetic disk, non-repeatable runout (NRRO) due to vibration, which has no regularity with respect to rotation of the spindle motor, may occur at the position in which the tracking pattern is written. Additionally, a microscopic defect may occur on a data storage medium (magnetic disk). NRRO and/or medium defects, often create a fluctuation in the position error signal PES of the head, even if there is no actual displacement in the head actuator arm when the tracking pattern is regenerated.

If the fluctuation in the head position or fluctuation in the velocity of the magnetic head in the track width direction is greater than the first and second criteria described above, a write operation is inhibited. In the case where the position error signal PES is increased by fluctuation independent of the displacement of the head actuator arm after a short time has elapsed from the settling of the head against the disk, the head is not considered to be moved too far from the original track position. Therefore, after a short time has elapsed from the settling of the head, a slight increase in the PES is considered negligible.

In the case where the criteria for the head velocity in the track width direction is set to take into consideration the state immediately after the settling of the head, the criteria is too strict with respect to the fluctuation in the PES after a short time from the settling of the head. Consequently, unnecessary write inhibit operations are frequently performed. This often degrades the write performance of the drive.

SUMMARY OF THE INVENTION

It is an object of the present invention to minimize unnecessary write inhibit operations in order to enhance the write performance of a disk drive.

A disk drive according to one embodiment of the present invention includes a disk storage medium having concentrically formed circular tracks. Each track includes data areas in which data sectors are recorded and servo areas in which servo sectors are recorded. The disk drive also includes a head for performing read and write operations on the disk storage medium; a seek controller for controlling a seek operation in which the head is moved to a desired track; and a detector for determining a velocity in a track width direction of the head. Additionally, the disk drive includes an allowable-value controller for increasing an allowable value of the velocity in the track width direction of the head in correspondence with elapsed time since the seek operation and a write inhibition controller for inhibiting the write operation if the velocity in the track width direction of the head detected by the detector exceeds the allowable value.

The disk drive may further include a tracking error detector for detecting an error between a position of the head and the object track and a tracking controller for controlling the head position after an end of the seek operation in correspondence with the error detected by the tracking error detector. In this case, the write inhibition controller inhibits the write operation if the error detected by the tracking error detector is greater than a predetermined allowable error value.

The servo areas are formed for each predetermined rotational angle on each of the tracks. The number of data sectors on the data area varies in correspondence with a radial position of the data area. The disk drive may also provide means for recording a table which stores information for identifying each of the data sectors and the position at which each of the data sectors are recorded on the disk.

The present invention also describes a write control method for a disk drive which includes a disk storage medium having circular tracks, each track having data areas in which data sectors are recorded and servo areas in which servo sectors are recorded. The write control method includes the steps of performing a seek operation for moving a head to a desired track; detecting a velocity of the head in the track width direction; increasing an allowable value for the velocity of the head in the track width direction in correspondence with the time elapsed from the end of the seek operation; and inhibiting the write operation if the detected velocity of the head in the track width direction exceeds the allowable value.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Figure 1:
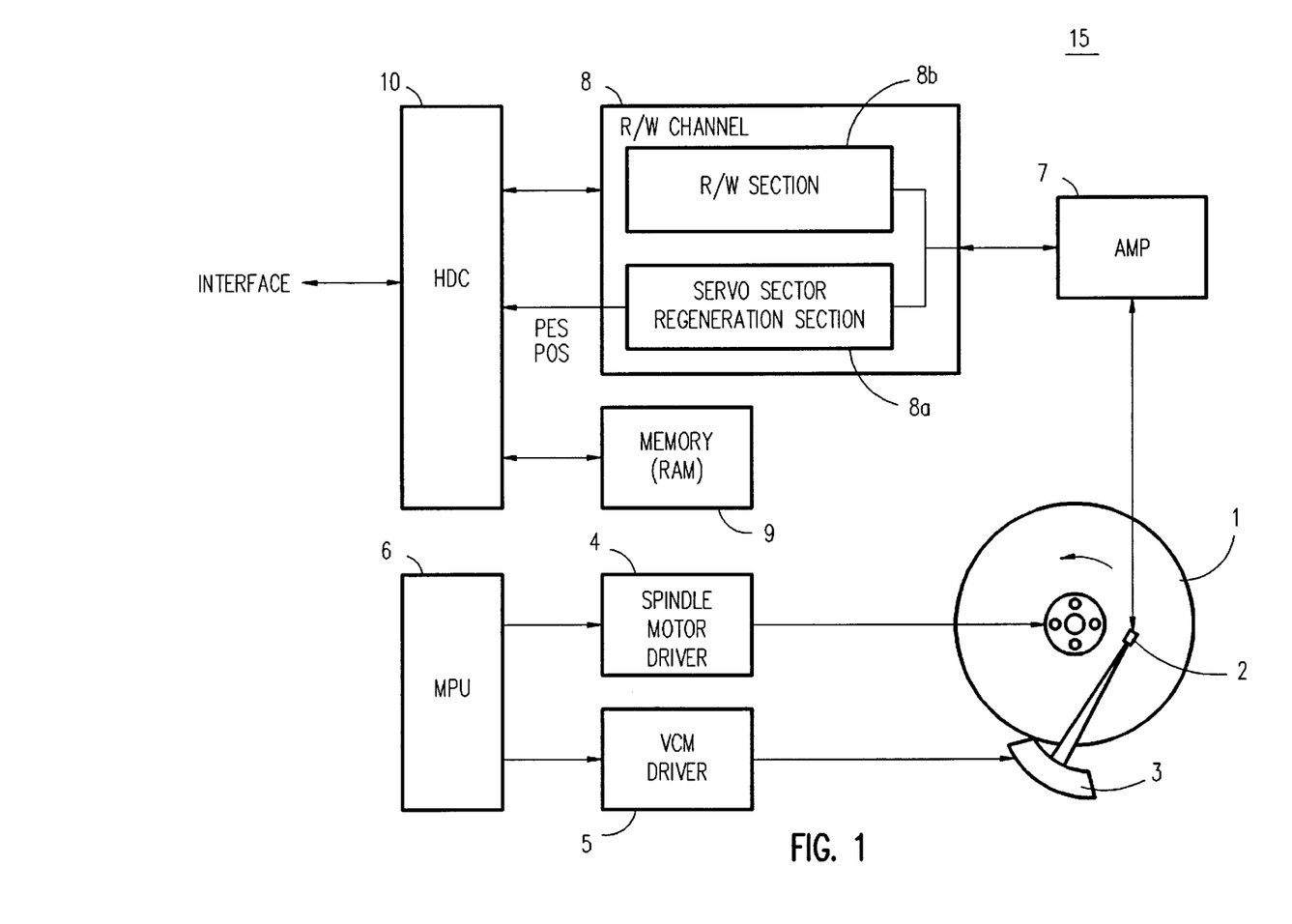
FIG. 1 is a block diagram of a disk drive according to one embodiment of the present invention.

FIG. 1 is a block diagram illustrating a disk drive according to one embodiment of the present invention. A disk drive 15 includes a magnetic disk 1 for recording data, a magnetic head 2, an actuator 3 for moving magnetic head 2 in a substantial arcuate path across the radius of magnetic disk 1, and a spindle motor driver 4 for controlling the rotation of magnetic disk 1. The disk drive 15 also includes a voice coil motor (VCM) driver 5 for driving actuator 3, a microprocessor unit (MPU) 6 for controlling spindle motor driver 4 and VCM driver 5, and an amplifier 7 for amplifying the output signal from magnetic head 2 (e.g. a write signal). Additionally, disk drive 15 includes a read/write channel 8 for performing read and write controls, a random access memory (RAM) 9 for storing data such as a defective sector table, and a hard-disk controller (HDC) 10 for performing control of the entire drive.

Figure 2:
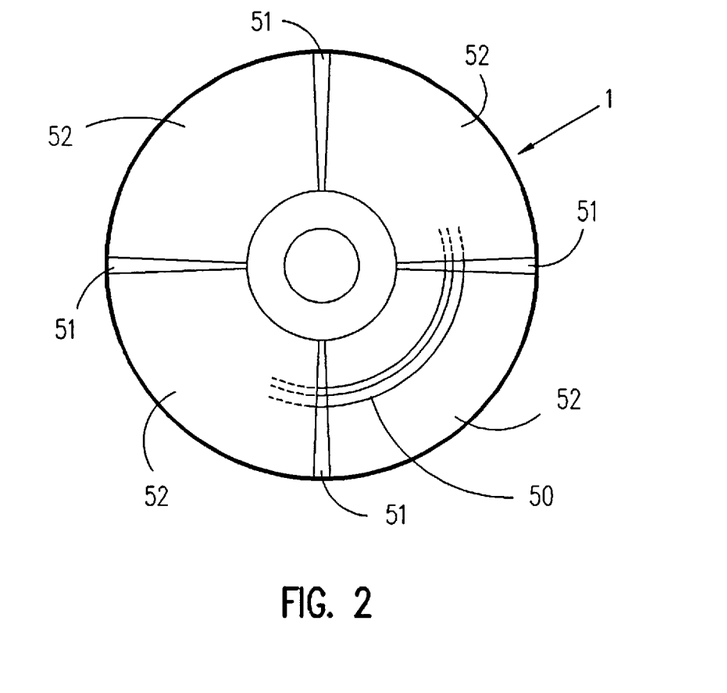
FIG. 2 illustrates the format in which servo and data areas are recorded on a magnetic disk for the disk drive shown in FIG. 1.

Referring now to FIG. 2, circular tracks 50 having a predetermined width are formed on the surface of magnetic disk 1. Each track 50 includes servo areas 51 and data areas 52. Servo sectors for performing tracking control are written in the servo areas 51 and data sectors are written in the data areas 52. The servo areas 51 are positioned on the surface of magnetic disk 1 at intervals separated by a predetermined rotational angle (for example, 360°/66).

Figure 3:
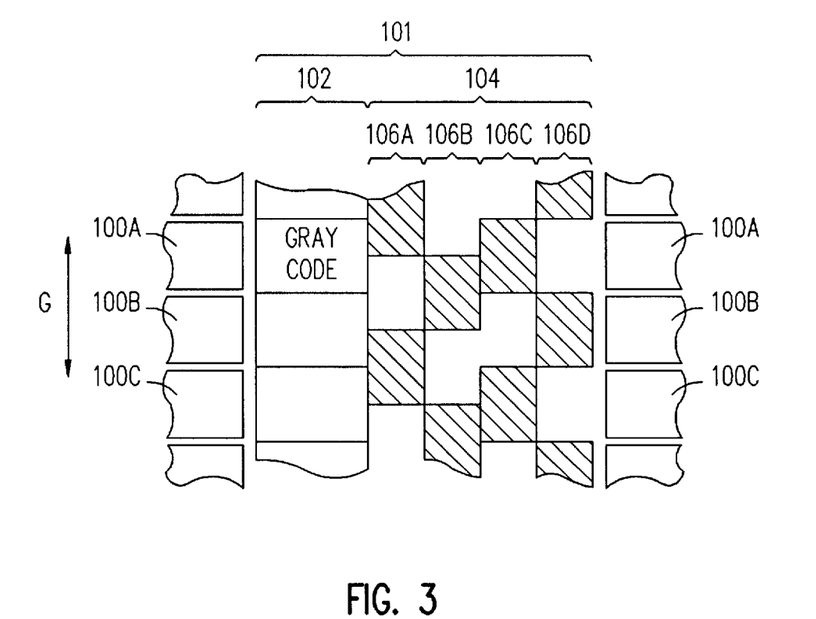
FIG. 3 illustrates the format in which servo sectors are recorded along the tracks of the magnetic disk shown in FIG. 2.

Referring now to FIG. 3, tracks 100A, 100B, and 100C on which data sectors are recorded on a data area 52. Furthermore, a servo sector 101, which includes an identification information storage area 102 and a burst pattern storage area 104 are recorded on a servo area 51.

Each of the tracks is previously assigned a cylinder ID (CYLID), which is equivalent to a track number (TRK). Also, each servo sector 101 is assigned a physical sector number (PHSN). A servo area start code followed by a cylinder ID encoded with a gray code (cyclic binary code) and identification information having a predetermined number of bits representing a physical sector number are recorded in the identification information storage area 102. Such identification information encoded with a gray code can be regenerated by a Viterbi decoding method even during a seek operation. A plurality of burst patterns such as the four patterns 106A, 106B, 106C, and 106D, are recorded in the burst pattern storage area 104. Note that for each burst pattern, the areas recorded with signals are arranged in the radial direction of the disk.

Figure 4:
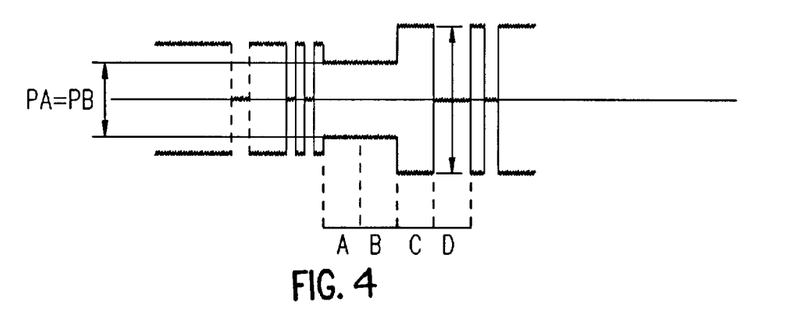
FIG. 4 is a diagram illustrating an example of the regenerative waveform of the servo sector obtained as a magnetic head passes over the center of a rotating track.

FIG. 4 shows an example of the regenerative waveform of servo sector 101 which is regenerated as magnetic head 2 passes over the center of track 100A while magnetic disk 1 is rotating. According to FIG. 4, A, B, C, and D represent the regenerative waveforms of burst patterns 106A, 106B, 106C, and 106D, respectively. In this case, that is, when magnetic head 2 passes over center of the track 100A, the amplitudes PA and PB of the regenerative waveforms of burst patterns 106A and 106B are equal to each other. More specifically, the amplitudes PA and PB are equal because the portion of the burst pattern 106A and the portion of the burst pattern 106B over which magnetic head 2 passes are equal in width to each other.

Figure 5:
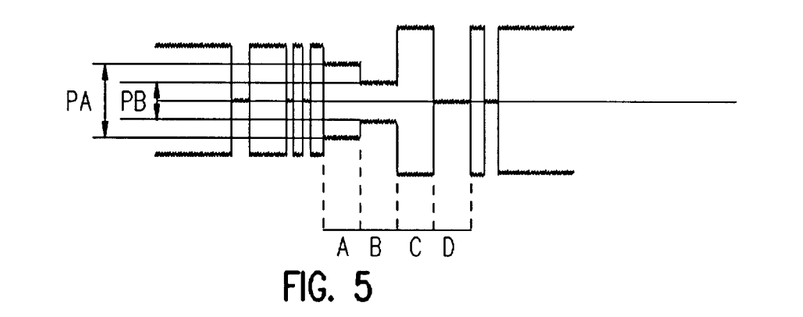
FIG. 5 is a diagram illustrating an example of the regenerative waveform of the servo sector obtained as a magnetic head passes over a position offset from the center of a rotating track.

On the other hand, when magnetic head 2 passes over a position offset from the track center, the portion of the burst pattern 106A and the portion of the burst pattern 106B over which the magnetic head 2 passes are not equal in width. The difference between the amplitudes PA and PB of the regenerative waveform of these patterns correspond to how much magnetic head 2 is offset from the track center, as shown in FIG. 5.

The read/write channel 8 generates a position error signal (PES) representative of an error in the head position based on a ratio of the amplitudes of the regenerative signals of the burst patterns 106A and 106B and supplies the PES to HDC 10. For one embodiment of the present invention, the following equation PES=PA/(PA+PB) is used to calculate the PES.

The PES is computed as an analog signal having a voltage of between 0 to 1 volt (V). The read/write channel 8 converts the analog PES signal to a digital signal having a value of between 0 to 225. When magnetic head 2 passes over the center of track 100A, PA and PB are equal to each other such that PES–0.5V based on the equation PES=PA/(PA+PB). When this analog PES is converted to a digital value it becomes 127.

If magnetic head 2 is offset from the center of track 100A (e.g., in a downward direction in FIG. 3) and does not pass over burst pattern 106A but passes only over burst pattern 106B, the amplitude PA of burst pattern 106A over which magnetic head 2 passes is 0, such that PA/(PA+PB) becomes 0 V and the position error signal PES becomes 0. On the other hand, if magnetic head 2 is offset from the center of the track 100A (e.g., in an upward direction in FIG. 3) and passes only over burst pattern 106A but does not pass over the burst pattern 106B, the amplitude PB is 0, such that PA/(PA+PB) becomes 1 V and the position error signal PES becomes 255.

The channel 8 includes a servo sector regeneration section 8a and a read/write section 8b as shown in FIG. 1. The servo sector regeneration section 8a detects the servo area 51 and regenerates a servo sector, while the read/write section 8b performs data read and write operations on the data area 52, based on the position of the servo area 51 detected by the servo sector regeneration section 8a.

The servo sector regeneration section 8a produces a PES in the aforementioned way and supplies it to HDC 10. In addition, this servo sector regeneration section 8a detects a track number (TRK) from the regenerative output of the identification information storage area of servo sector 101, and supplies a value of the PES added to the TRK to HDC 10 as information (POS), which is representative of a head position.

A seek operation is described below. When HDC 10 receives an external data write command, it controls MPU 6 so that the magnetic head 2 is moved to a desired track. Meanwhile, HDC 10 monitors the current position of magnetic head 2, based on the position information POS and position error signal PES which are provided by servo sector regeneration section 8a of read/write channel 8.

Once magnetic head 2 arrives at a desired track (i.e., the seek operation is completed), HDC 10 performs a track following operation based on PES from the servo sector regeneration section 8a. The track following operation causes magnetic head 2 to move over the desired track. The HDC 10 then starts a write operation.

It is important to note that if a write operation is performed at an off-track position considerably remote from the center of the object track, the data stored on an adjacent track is often destroyed by the write operation. For this reason, this disk drive sets an allowable error (Cp) for the position of magnetic head 2, and if the position error signal PES from a desired track exceeds this Cp, a write operation is inhibited. Also, if the velocity of magnetic head 2 in the track width direction exceeds an allowable value (Cv), a write operation will be inhibited because there is the possibility that the position error signal PES exceeds Cp.

Figure 6:
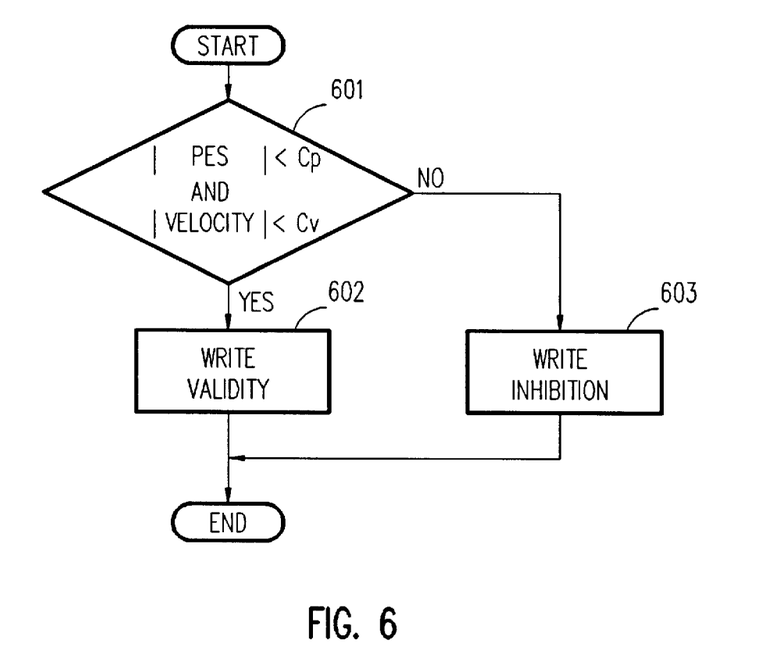
FIG. 6 is a flowchart illustrating the write inhibition process that is implemented by a hard-disk controller.

FIG. 6 illustrates the write inhibition process performed by HDC 10 for one embodiment of the present invention. More specifically, HDC 10 computes the velocity of magnetic head 2 in the track width direction from a velocity change in the PES (i.e., a difference in PES between adjacent samples) supplied from servo sector regeneration section 8a. In step 601, HDC 10 computes the absolute value of a PES and the absolute value of the velocity in the track width direction of magnetic head 2. The HDC 10 determines whether or not the absolute value of a PES is less than Cp and whether the absolute value of the velocity of magnetic head 2 in the track width direction is less than Cv. If both these conditions are satisfied in step 601, HDC 10 advances to step 602. In step 602, if it is determined that the conditions are not satisfied, write operation is valid. If the conditions are not satisfied in step 601, HDC 10 advances to step 603. In step 603 the write operation is inhibited.

Immediately after the settling of magnetic head 2 with respect to disk 1 during a seek operation (i.e., immediately after completion of the seek operation), the position of magnetic head 2 is considered to be unstable because the vibration of the head actuator arm caused by the seek operation has not been attenuated. For this reason, it is desirable to reduce the allowable value Cv for the velocity in the track width direction of magnetic head 2 to reliably prevent a write operation at an off-track position.

The burst patterns 106A, 106B, 106C, and 106D are written during fabrication. The vibration developed when the burst patterns are written may cause these patterns to be written with a microscopic offset, resulting in non-repeatable runout (NRRO) which has no regularity with respect to rotation of the spindle motor. Additionally, a microscopic defect may occur on magnetic disk 1. The presence of NRRO and/or medium defect may cause the position error signal PES to fluctuate as shown in FIG. 7, although the position of magnetic head 2 does not actually change when burst patterns are regenerated.

Figure 7:
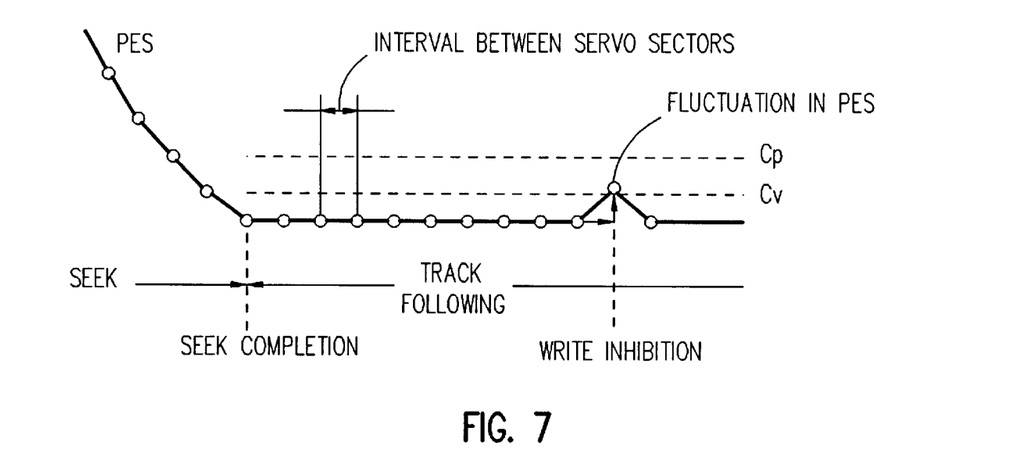
FIG. 7 is a diagram illustrating the fluctuation of position error signal obtained during a seek operation.

FIG. 7 shows the PES with respect to the elapsed time during and after a seek operation. In FIG. 7, the white circles correspond to the PES detected from the burst patterns of each servo sector. The interval between white circles is the interval between servo sectors, that is, time equivalent to $\frac{1}{66}$ of one revolution (in the case of 66 sectors/track). For example, in the case of a magnetic disk being rotated at 5400 rpm, the interval between servo sectors is equivalent to $(1,000,000 \times 60)/(5,400 \times 66)$ μs, or approximately 168 μs.

The aforementioned fluctuation in the PES is not one which is caused by actual displacement of magnetic head 2. Therefore, even if a velocity change in the PES is slightly greater, it does not interfere with an actual write operation. If a write operation is inhibited each time such fluctuation in the PES occurs, a write inhibition operation may be performed even when it is not necessary. Consequently, the write performance of the drive is reduced. For this reason, after the position of magnetic head 2 has been stabilized, it is preferable to slightly increase the allowable value Cv of the velocity of magnetic head 2 in the track width direction.

The disk drive according to the present invention is constructed so that the aforementioned Cv is increased in correspondence with the time elapsed after the completion of a seek operation. More specifically, MPU 6 implements the process shown in FIG. 8 at intervals of a predetermined time (for example, in synchronization with regeneration of a servo sector). In step 811 it is determined whether or not a seek operation has been completed. If it has not been completed, MPU 6 ends the process. If it has been completed, MPU 6 advances to step 812.

Figure 8:
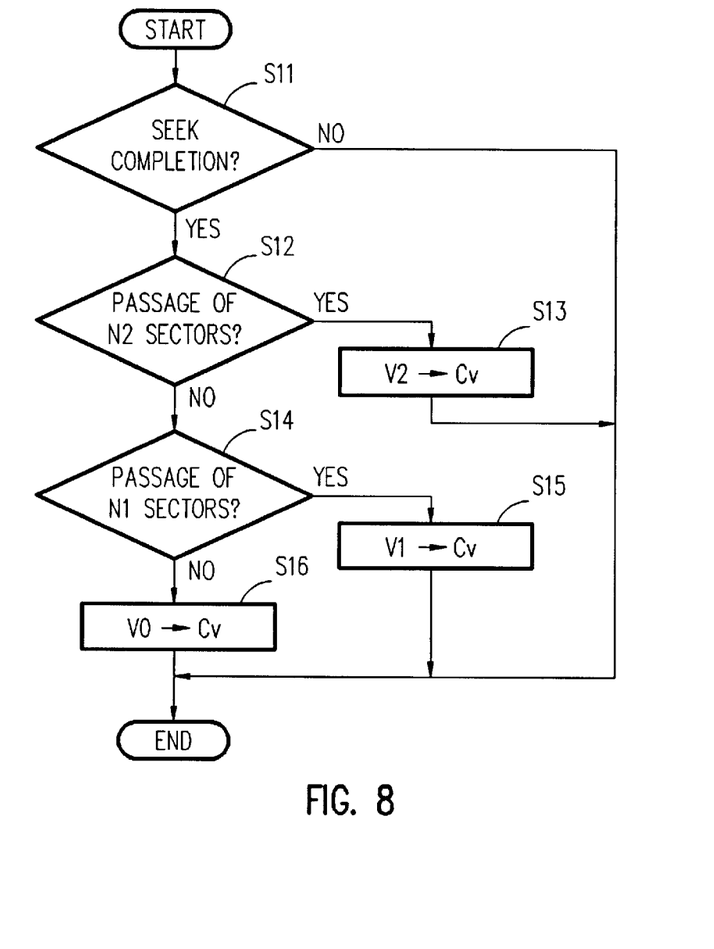
FIG. 8 is a flowchart showing how the allowable value of the velocity of the magnetic head in the track width direction is controlled by a microprocessor unit.

In step 812 MPU 6 determines whether or not the time equivalent to N2 sectors has elapsed. If the determination is YES, MPU 6 advances to step 813. In step 813 MPU 6 sets Cv to V2 and ends the process. If the determination is NO, MPU 6 advances to step 814.

In step 814 MPU 6 determines whether or not the time equivalent to N1 sectors has elapsed. If the determination is YES, MPU 6 advances to step 815. In step 815 MPU 6 sets Cv to V1 and ends the process. If the determination is NO, MPU 6 advances to step 816. In step 816 MPU 6 sets Cv to V0 and ends the process.

In the aforementioned process, N1 is less than N2 (N1<N2), and V1 is greater than V0 and less than V2 (V0<V1<V2). Suppose, for example, that N1 is 5, N2 is 10, V0 is 18H, V1 is 25H, and V2 is 32H. In the interval between 6 sectors from sector 0 to sector 5 after completion of a seek operation, Cv becomes 18H. In the interval between 5 sectors from sector 6 to sector 10, Cv becomes 25H. After sector 11, Cv becomes 32H.

Figure 9:
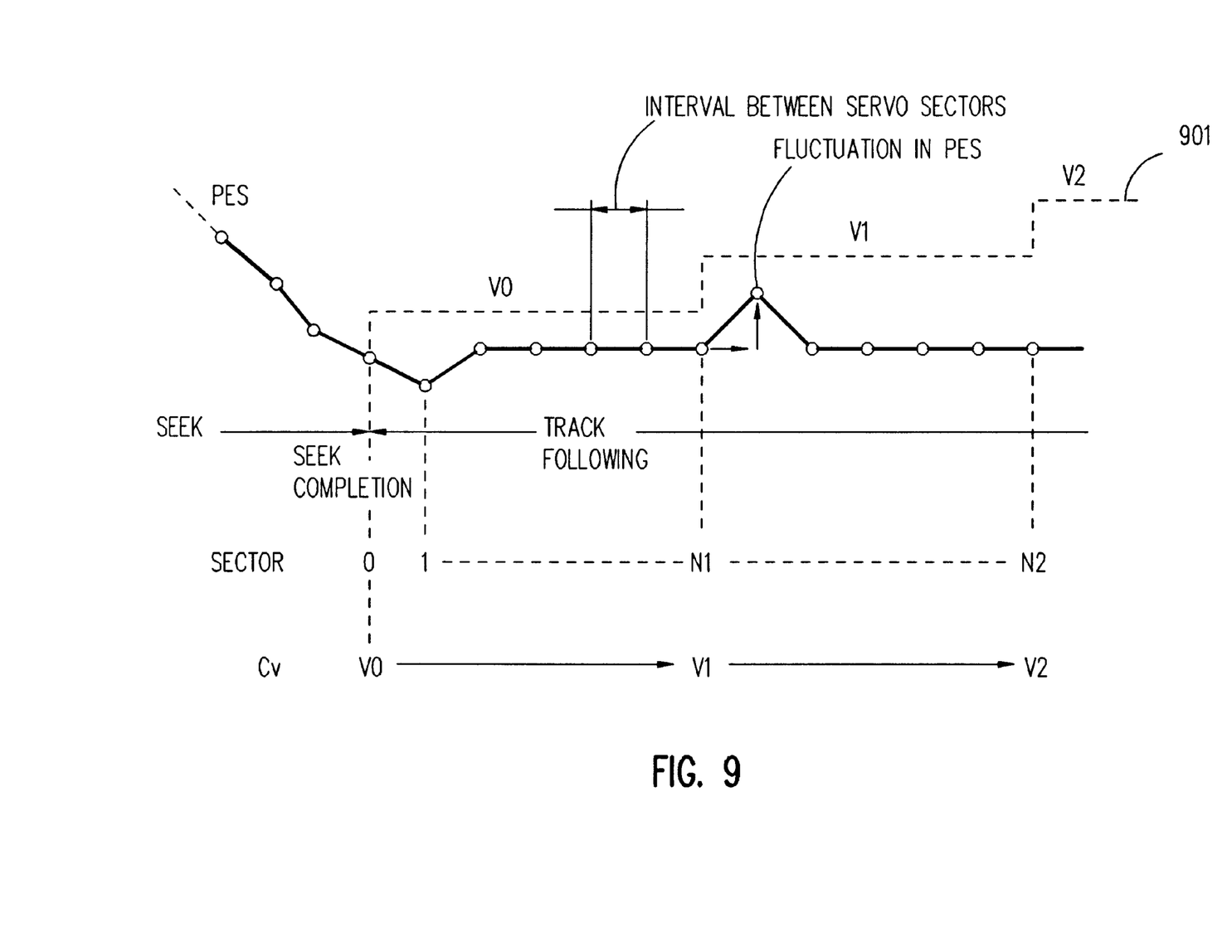
FIG. 9 is a diagram showing the fluctuation of a position error signal obtained during a seek operation.

If the aforementioned process is performed, the allowable value Cv for the velocity in the track width direction of magnetic head 2 can be increased in stages as time elapses, as shown by a broken line (i.e., line 901) in FIG. 9. Therefore, if the allowable value Cv for the velocity in the track width direction of magnetic head 2 is set to a relatively small value immediately after magnetic head 2 is settled with respect to disk 1 after the seek operation, the data recording in an off-track state can be reliably prevented. Also, if the allowable value Cv for the velocity in the track width direction of magnetic head 2 is set to a relatively large value after a predetermined time after the settling of magnetic head 2, the unnecessary write inhibitions can be avoided. Therefore, the write performance of the disk drive can be enhanced.

If a magnetic disk having a slight NRRO and a medium defect is used in a conventional disk drive in which an allowable value for the velocity in the track width direction of a magnetic head is constant, there may be situations in which a write operation is determined to be defective because a write inhibit operation is performed due to the fluctuation in the PES which occurs after the position of magnetic head 2 stabilizes. On the other hand, for a disk drive according to one embodiment of the present invention, the fluctuation in the PES is allowed, to a certain extent, after the position of magnetic head 2 stabilizes. Therefore, the allowable amount of NRRO and medium detects in a magnetic disk which is recognized as a defective-free magnetic disk is increased. This enhances the yield for a magnetic disk and therefore can reduce the fabrication cost.

For the embodiment shown in FIGS. 8 and 9, the change in the Cv occurs in 3 stages. However, for alternative embodiments, the Cv change is not limited to 3 stages, for example, it may occur in 2 stages. In such a case, steps 812 and 813 in FIG. 8 are unnecessary. Assume, for example, that N1 is 10, V0 is 18H, and V1 is 32H. During the interval between 11 sectors from sector 0 to sector 10, Cv is 18H, and after sector 11, Cv is 32H.

Note that No-ID sector format can be employed as a recording format in which servo and data areas are recorded on magnetic disk 1 of the aforementioned disk drive.

In the No-ID sector format, as with FIG. 2, 66 servo areas 51 are formed along each track on the magnetic disk 1 for each predetermined angle. The number of data sectors which are recorded on the data area 52 between adjacent servo areas 51 is increased from the inner track toward the outer track so that the recording densities along tracks assume relatively near values. The servo sector which is recorded on the servo area 51 contains a cylinder ID (CYLID) and a physical sector number (PHSN) for identifying a servo sector, and burst patterns.

Making the number of data sectors which are recorded on the data area 52 an integer that is compatible with the effective utilization of the data area 52 is difficult. For this reason, one data sector can be divided and recorded into a plurality of data areas 52, as shown in FIG. 10.

Figure 10:
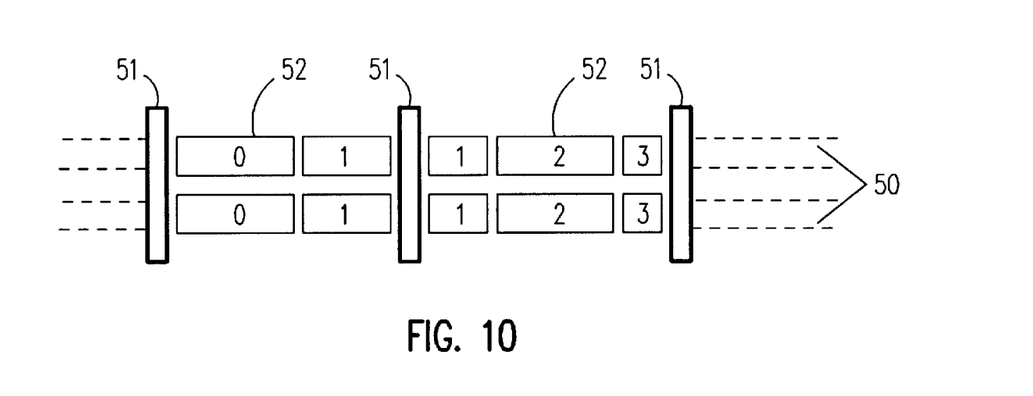
FIG. 10 is a diagram showing the No-ID sector format in which servo and data areas are recorded along tracks on a magnetic disk.

The No-ID sector format, as shown in FIG. 10, does not include an ID field for recording an identification number unlike many conventional formats which include an ID field for each data sector. The ID field and the margins (W/R fields) provided before and after the ID field occupy about 15% of the track capacity. For this reason, the track capacity can be increased about 15% when using a No-ID sector format.

Figure 11:
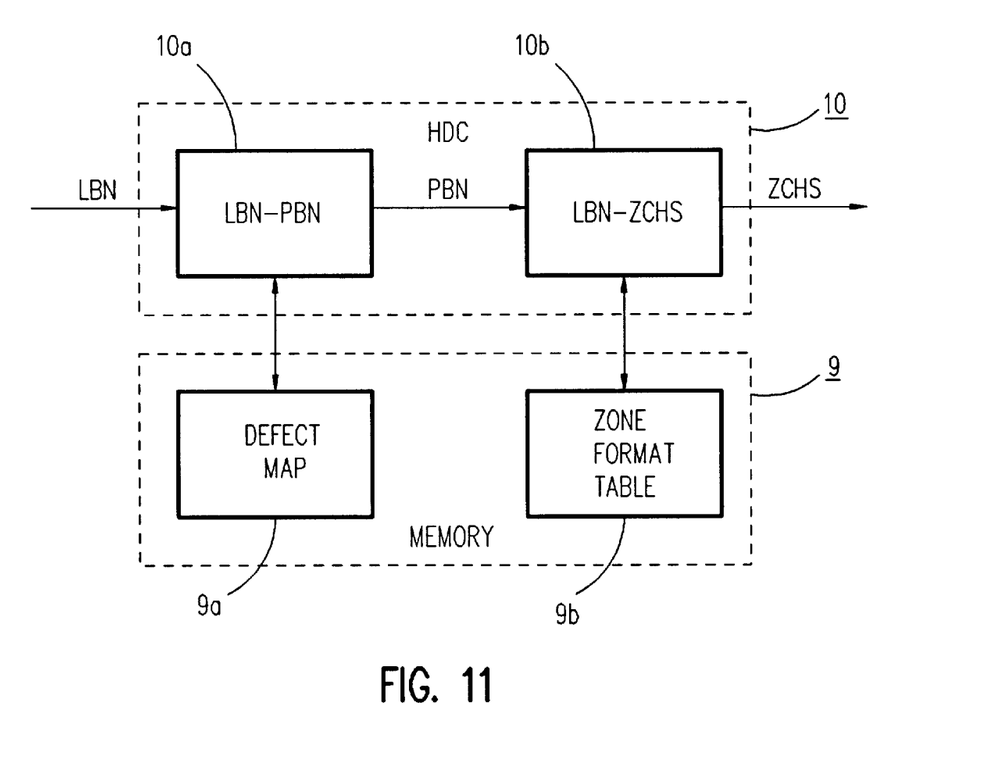
FIG. 11 is a block diagram the process in which the position at which a data sector is actually recorded is computed from a logic block number.

For a No-ID sector format, a defect map 9a and a zone format table 9b are stored in memory 9, as shown in FIG. 11. The defect map 9a is represented by a table which shows the correspondence between the logical block number (LBN) and the physical block number (PBN) of a data sector. The zone format table 9b illustrates the actual storage positions (zone, cylinder, head, sector) on a magnetic disk. The zone format table 9b also includes information indicating whether or not one sector has been divided and recorded onto a plurality of data areas 52.

The position on magnetic disk 1 at which an object data sector is recorded can be determined by referring to tables 9a and 9b. If a method of allocating data sectors having a regularity such as a sector allocating order for a track, the contents of the tables 9a and 9b can be computed according to a fixed rule. For this reason, tables 9a and 9b can be recorded in data-compressed form.

For a conventional format an having ID field, when a read operation or a write operation is performed on a data sector, ID data is read out from the ID field corresponding to that sector. Then, it is determined whether or not the sector is defective. Next, the position at which the sector is divided is determined.

On the other hand, for a No-ID sector format, these determinations are made by reading out tables 9a and 9b stored in memory 9 of HDC 10. Therefore, there is no need to read out the ID field prior to read and write operations. Thus, in the No-ID sector format, read and write operations can be performed at high speed compared with the format having an ID field for each data sector.

In a disk drive adopting the aforementioned No-ID sector format, if the write inhibition process shown in FIGS. 6 and 8 is performed, some of the major factors that impede high-speed read and write operations are reduced.

For the No-ID sector format there is no need to read out ID data, therefore, the only requirement for performing a write inhibition process is that the POS and PES from the servo sector regeneration section 8a are processed, because there is no need to read out ID data. Furthermore, there is no need to process the output of read/write section 8b of read/write channel 8. For this reason, the processing load to HDC 10 is reduced.

For the present invention, an allowable value for the velocity in the track width direction of a magnetic head is increased in correspondence with the time elapsed from the end of a seek operation. Furthermore, if the head velocity in the track width direction exceeds the allowable value, the write operation by the head is inhibited. Immediately after a seek operation during which the head position is unstable, the allowable value for the head velocity in the track width direction is increased so that the data recording at an off-track position can effectively be prevented. After the head position is relatively stabile, the allowable value for the head velocity in the track width direction is reduced so that unnecessary write inhibition is avoided. Accordingly, the write performance of the disk drive is enhanced.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method of controlling write operations in a disk drive, comprising the steps of:
   (a) performing a seek operation to move a head to a desired track in response to a write operation;
   (b) determining a time elapsed from the completion of said seek operation;
   (c) determining a velocity of said head in a track width direction;
   (d) adjusting a velocity threshold value in said track width direction in correspondence with the time elapsed from the completion of said seek operation; and
   (e) inhibiting said write operation if said velocity exceeds said velocity threshold value.

2. The method of claim 1, wherein step (c) comprises the step of:
   (1) increasing said velocity threshold value in said track width direction in correspondence with the time elapsed from the completion of said seek operation at predetermined intervals.

3. The method of claim 2, wherein step (1) comprises the steps of:
   (i) increasing said velocity threshold value from V0 to V1 after a first predetermined interval; and
   (ii) increasing said velocity threshold value from V1 to V2 after a second predetermined interval, wherein V2>V1>V0.

4. The method of claim 1, further comprising the steps of:
   (e) determining a position error signal representative of an error in a head position; and
   (f) inhibiting said write operation if said position error signal exceeds a predetermined position error threshold value.

5. A disk drive, comprising:
   a rotatable disk having at least one track for storing information;
   a head positioned to read said information from and write information to said disk;
   a read/write channel coupled to said head to receive said information from said head;
   a controller coupled to said read/write channel and configured to perform a write inhibit operation if a velocity of said head in the track width direction exceeds a velocity threshold value in the track width direction, said controller adjusting said velocity threshold value in correspondence with the time elapsed from the completion of a seek operation.

6. The disk drive of claim 5, wherein said controller increases said velocity threshold value from V0 to V1 after a first predetermined interval and increases said velocity threshold value from V1 to V2 after a second predetermined interval, wherein V2>V1>V0.

7. The disk drive of claim 5, wherein said controller is configured to perform a write inhibit operation if a position error signal exceeds a predetermined position error threshold value.

8. A storage apparatus comprising a head and a controller configured to generate a write inhibit signal if a velocity of the head in a track width direction exceeds a velocity threshold value in the track width direction, said controller adjusting said velocity threshold value in correspondence with the time elapsed from the completion of a seek operation.

9. The apparatus of claim 8, wherein the controller increases said velocity threshold value from V0 to V1 after a first predetermined interval and increases said velocity threshold value from V1 to V2 after a second predetermined interval, wherein V2>V1>V0.

10. The apparatus of claim 8, wherein the controller is configured to perform a write inhibit operation if a position error signal exceeds a predetermined position error threshold value.

* * * * *